May 25, 1926.

A. A. AMSTUTZ 1,585,957

FRICTION GEAR

Filed Jan. 25, 1926

Amos A. Amstutz Inventor

By C.A.Snow&Co.

Attorneys

May 25, 1926.

A. A. AMSTUTZ

FRICTION GEAR

Filed Jan. 25, 1926

Amos A. Amstutz, Inventor

Patented May 25, 1926.

1,585,957

UNITED STATES PATENT OFFICE.

AMOS A. AMSTUTZ, OF SILVERTON, OREGON.

FRICTION GEAR.

Application filed January 25, 1926. Serial No. 83,746.

This invention aims to provide novel means whereby power may be transmitted, and, especially, to provide means whereby angularly disposed driving and driven parts may be connected operatively, it being possible to change the speed ratio between the driving and driven parts.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
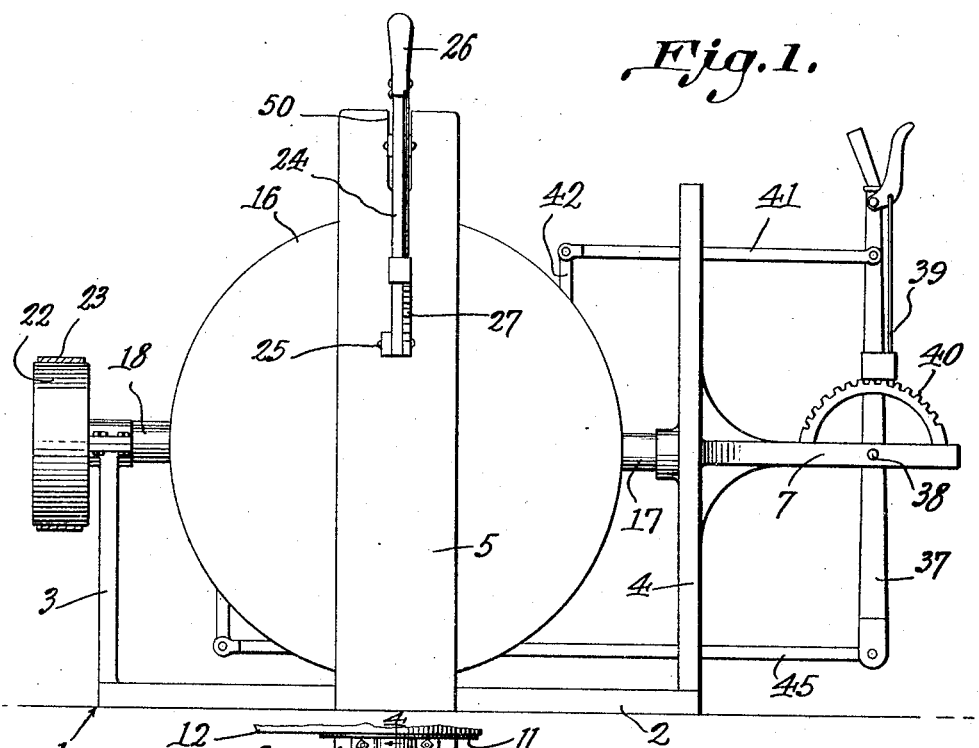
Figure 1 shows in elevation, a machine constructed in accordance with the invention.
Figure 2:
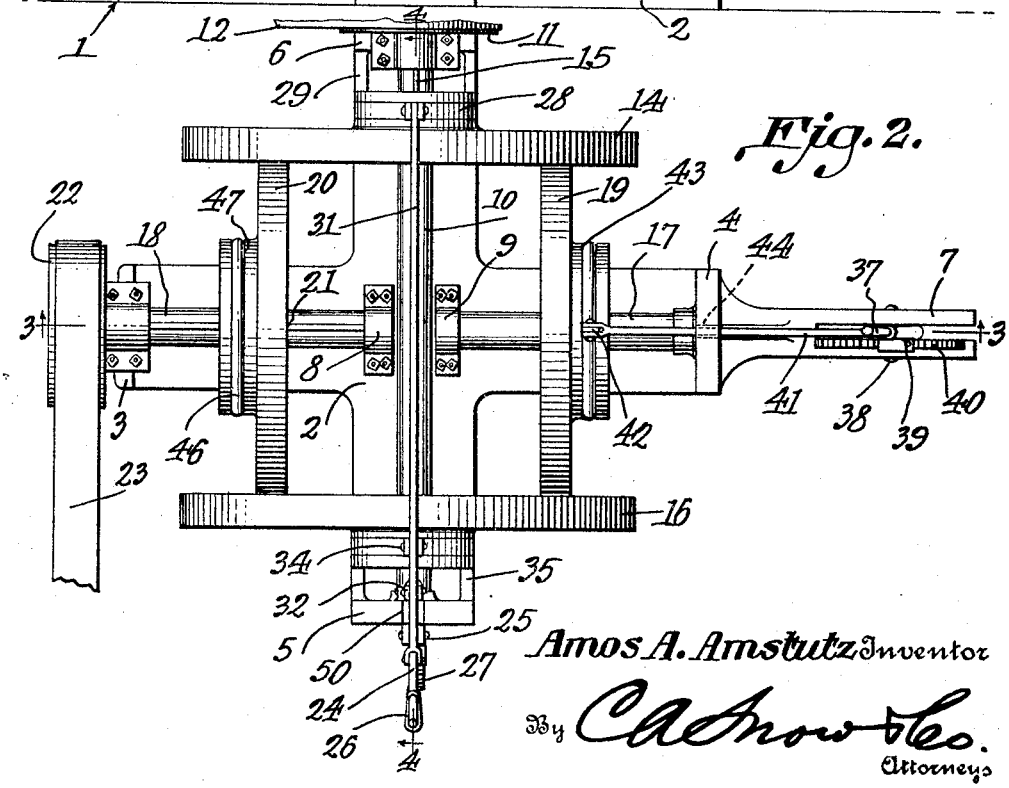
Figure 2 is a top plan.
Figure 3:
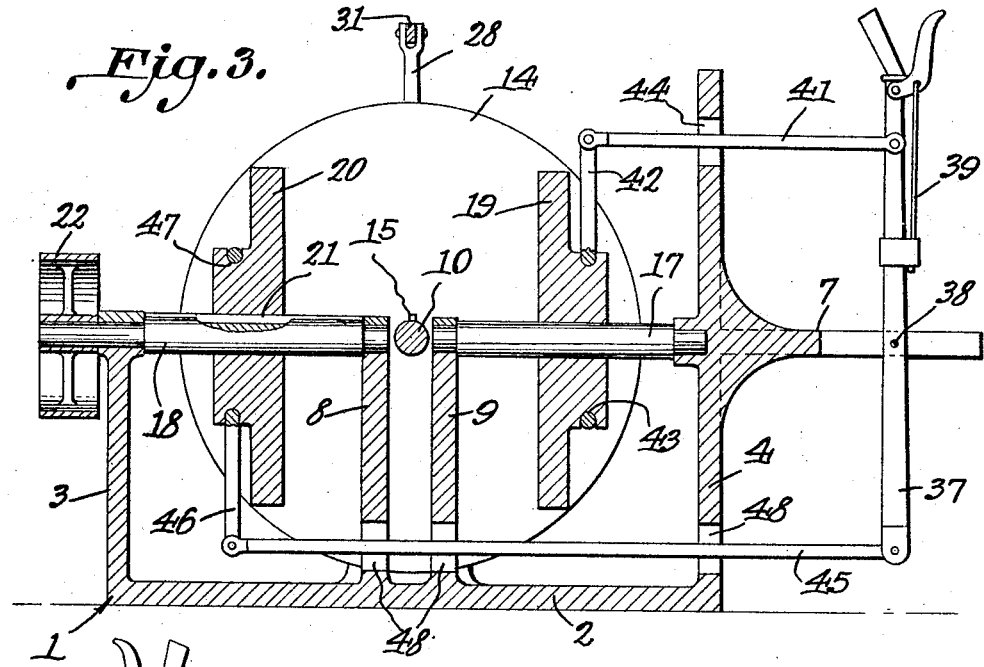
Figure 3 is a section on the line 3—3 of Figure 2.
Figure 4:
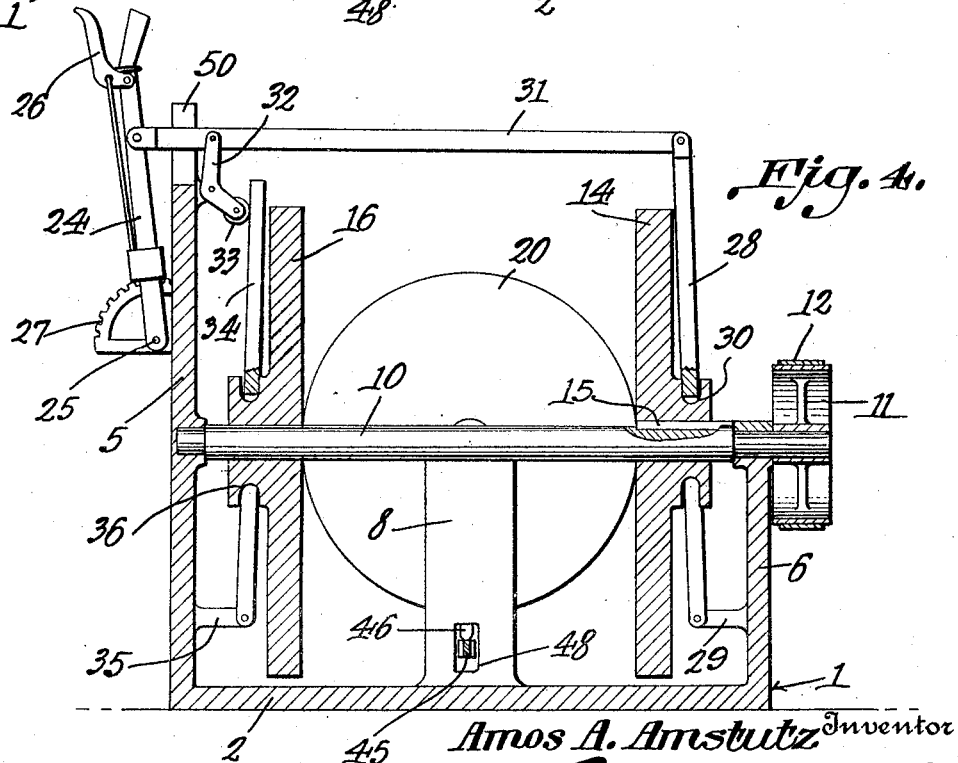
Figure 4 is a section on the line 4—4 of Figure 2.

The device forming the subject matter of this application comprises a support 1, which may well include a cruciform base 2, on which is mounted a short standard 3 and a long standard 4, the standards 3 and 4 being disposed opposite to each other. A long standard 5 is mounted on the base 1 and is located 90° remote from the standards 3 and 4. A short standard 6 is mounted on the base 2 and is disposed opposite to the standard 5. The standard 4 has an outwardly projecting forked arm 7. Pedestals 8 and 9 are erected on the base 2 near to the geometrical center thereof.

A drive shaft 10 is journaled in the standards 5 and 6, the pedestals 8 and 9 being spaced apart, so that the drive shaft 10 may extend between them. Rotation may be imparted in any desired way to the drive shaft 10, for instance, by means of a pulley 11 and a belt 12 mounted on the drive shaft and located outwardly of the standard 6.

A first friction wheel 14 is splined at 15 to the shaft 10, the construction being such that, although the friction wheel 14 rotates with the shaft 10, the friction wheel can slide on the said shaft, longitudinally thereof. A second friction wheel 16 is disposed parallel to the first friction wheel 14 and is located inwardly of the standard 5, the friction wheel 16 being rotatable on the shaft 10 and being slidable longitudinally of that shaft.

A shaft 17 is mounted at its ends in the standard 4 and in the pedestal 9. A shaft 18 is journaled at its ends in the standard 3 and in the pedestal 8. The shafts 17 and 18 are axially alined, and are disposed at right angles to the shaft 10.

A first friction disk 19 is located inwardly of the standard 4 and is mounted on the shaft 17 to rotate thereon and to slide therealong. A second friction disk 20 is disposed parallel to the friction disk 19 and inwardly of the standard 3. The friction disk 20 is splined at 21 to the shaft 18 to rotate therewith and to slide therealong. The friction disks 20 and 21 engage peripherally with the inner surfaces of the friction wheels 14 and 16. Any suitable means may be provided for taking power off the shaft 18, for instance, a pulley 22 and a belt 23 located outwardly of the standard 3.

A means is provided for starting and stopping the machine, and, with this end in view, a lever 24 is fulcrumed at its lower end, as at 25, on the standard 5, the lever being supplied with a latch mechanism 26, adapted to cooperate with a segment 27 on the standard 5. The numeral 28 marks a forked radius arm, the lower end of which is pivoted to an inwardly extended bracket 29 on the standard 6. The radius arm 28 is received in a circumferential groove 30 which is formed in the hub of the friction wheel 14, the hub of the friction wheel turning in the radius arm 28. A horizontally disposed link 31 is provided, and is guided in a slot 50 formed in the upper end of the standard 5. One end of the link 31 is pivoted to the upper end of the radius arm 28, and the other end of the link is pivoted to the intermediate portion of the operating lever 24. The numeral 32 designates an auxiliary lever, fulcrumed intermediate its ends on the standard 5, at a point near to the upper end of the standard. The upper end of the auxiliary lever 32 is pivotally connected to the link 31. An anti-friction element, such as a wheel 33, is journaled on the lower end of the auxiliary lever 32, and bears against the upper end of a forked radius arm 34, the lower end of which is mounted pivotally on a bracket 35 extended inwardly from the standard 5. The radius arm 34 extends into a circumferential groove 36 on the hub of the friction wheel 16, the hub of the friction wheel rotating in the said radius arm.

A speed change mechanism is supplied, the same including a hand or operating lever 37 which is fulcrumed intermediate its ends at 38 on the arm 7 which projects from the standard 4. The lever 37 carries a latch mechanism 39 adapted to cooperate with a segment 40 on the arm 7. The outer end of a link 41 is pivoted to the lever 37, above the fulcrum 38. The inner end of the link 41 is pivoted to the upper end of a depending connection 42 received in a groove 43 in the hub of the friction disk 19, the connection 42 being retained on the hub of the disk 19, and the hub rotating in the connection 42. The link 41 is guided in an opening 44 that is fashioned in the standard 4. A lower link 45 is guided for reciprocation in openings 48 which are formed in the pedestals 8 and 9, and in the standard 4. The outer end of the link 45 is pivoted to the lower end of the lever 37, and the inner end of the link 45 is pivoted to an upwardly extended operating member 46 received and carried in a groove 47, which is formed in the hub of the friction disk 20.

In practical operation, when the shaft 10 is rotated by the pulley 11 and the belt 12, or by an equivalent mechanism, the wheel 14 is rotating, because it is splined at 15 to the shaft 10. The wheel 14 turns the disk 20, and the disk 20 rotates the shaft 18, because the disk 20 is splined at 21 to the shaft 18, power being taken off the shaft 18 by of the driven pulley 22 and the belt 23, assuming that the operator wishes to employ a pulley and belt connection at this point. The friction wheel 14, moreover, rotates the disk 19, the disk 19 rotates the friction wheel 16, and the friction wheel 16 transmits motion to the shaft 18 by way of the friction disk 20. A double connection thus is afforded between the driving shaft 10 and the driven shaft 18. When the machine is in operation, the friction wheels 14 and 16 turn in opposite direction, and the friction disks 19 and 20 turn in opposite directions also.

When it is desired to stop the rotation of the shaft 18, the lever 24 may be manipulated, motion being transmitted to the link 31, the pressure of the lever 32 and the wheel 33 on the wheel 16 being relieved, and the radius arm 28 being operated to prevent the friction wheel 14 from bearing against the disks 20 and 19, the wheel 16 no longer cooperating with the disks 19 and 20.

A change of speed may be brought about by shifting the friction disks 19 and 20 inwardly or outwardly with respect to the axis of rotation of the friction wheels 14 and 16. This is done by way of the lever 37, the link 41, and the connection 42, and by way of the link 45, and the connection 46, the friction disks 19 and 20 being shifted inwardly and outwardly in a way which will be understood readily by those skilled in the art.

What is claimed is:—

1. In a device of the class described, a support, a drive shaft journaled at its ends in the support, first and second axially alined shafts carried at their outer ends on the support and located on opposite sides of the drive shaft at right angles thereto, the support embodying means located on opposite sides of the drive shaft for carrying the inner ends of the axially alined shafts, a first friction wheel splined to the drive shaft to rotate therewith and to slide therealong, a second friction wheel mounted on the drive shaft to rotate thereon and to slide therealong, first and second friction disks engaged peripherally with the inner surfaces of the friction wheels, the first friction disk being mounted to rotate on the first of the axially alined shafts to rotate thereon and to slide therealong, the second friction disk being splined to the second of the axially alined shafts to rotate therewith and to slide therealong, means for applying power to the drive shaft, means for taking power from the second of the axially alined shafts, means for moving the friction wheels into and out of engagement with the friction disks, an upstanding connection wherein a part of the first friction disk is journaled, a depending connection wherein a part of the second friction disk is journaled, an operating lever fulcrumed intermediate its ends on the support, and upper and lower links guided in the support, the inner ends of the upper and lower links being joined, respectively, to the upstanding and depending connections, and the outer ends of the upper and lower links being pivoted to the lever on opposite sides of its fulcrum.

2. In a device of the class described, a support, a drive shaft journaled at its ends in the support, first and second axially alined shafts carried at their outer ends on the support and located on opposite sides of the drive shaft at right angles thereto, the support embodying means located on opposite sides of the drive shaft for carrying the inner ends of the axially alined shafts, a first friction wheel splined to the drive shaft to rotate therewith and to slide therealong, a second friction wheel mounted on the drive shaft to rotate thereon and to slide therealong, first and second friction disks engaged peripherally with the inner surfaces of the friction wheels, the first friction disk being mounted to rotate on the first of the axially alined shafts to rotate thereon and to slide therealong, the second friction disk being splined to the second of the axially alined shafts to rotate therewith and to slide therealong, means for applying power to the drive shaft, means for taking power from the second of the axially alined shafts, means for shifting the friction disks toward and away from the axis of rotation of the friction wheels, radius arms pivoted at their lower ends to the support, each friction wheel being journaled in the intermediate portion of one of the radius arms, an operating lever fulcrumed on the support, a link pivoted at its ends to the upper end of one radius arm and to the lever, and an auxiliary lever fulcrumed intermediate its ends on the support, one end of the auxiliary lever being pivoted to the link, and the opposite end of the auxiliary lever cooperating with the upper end of the other radius arm to swing it inwardly.

In testimony that I claim the foregoing as my own, I have hereto affixed my signature.

AMOS A. AMSTUTZ.